United States Patent
Kennedy et al.

(10) Patent No.: US 11,044,090 B2
(45) Date of Patent: Jun. 22, 2021

(54) FACILITATING REQUEST AUTHENTICATION AT A NETWORK EDGE DEVICE

(71) Applicant: Zendesk, Inc., San Francisco, CA (US)

(72) Inventors: Ryan C. Kennedy, San Mateo, CA (US); Erik O. Hartwig, San Francisco, CA (US); Ian R. Waters, Santa Cruz, CA (US); Andrei Balcanasu, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 248 days.

(21) Appl. No.: 16/043,717

(22) Filed: Jul. 24, 2018

(65) Prior Publication Data

US 2020/0036526 A1    Jan. 30, 2020

(51) Int. Cl.
*H04L 9/32* (2006.01)
*H04L 29/06* (2006.01)
(Continued)

(52) U.S. Cl.
CPC ........ *H04L 9/3213* (2013.01); *G06F 21/6218* (2013.01); *H04L 63/08* (2013.01);
(Continued)

(58) Field of Classification Search
CPC ..... H04L 9/3213; H04L 63/08; H04L 63/102; H04L 63/108; H04L 67/24; H04L 67/2814; H04L 67/2842; G06F 21/6218
(Continued)

(56) References Cited

U.S. PATENT DOCUMENTS

| 7,821,926 B2 * | 10/2010 | Hannel | H04L 63/0218 |
| | | | 370/229 |
| 8,136,143 B2 * | 3/2012 | Hannel | H04L 63/20 |
| | | | 726/1 |

(Continued)

OTHER PUBLICATIONS

Mobile Edge Cloud System: Architectures, Challenges, and Approaches Hang Liu, Fahima Eldarrat, Hanen Alqahtani, Alex Reznik, Xavier De Foy, Yanyong Zhang IEEE Systems Journal, vol. 12, No. 3, pp. 2495-2508, Sep. 2018 (Year: 2018).*

(Continued)

*Primary Examiner* — Samson B Lemma
*Assistant Examiner* — Mohammad S Shams
(74) *Attorney, Agent, or Firm* — Park, Vaughan, Fleming & Dowler LLP

(57) ABSTRACT

The disclosed embodiments relate to a system that processes requests to access data item at an edge device in a network. During operation, the system receives the request to access the data item from a user, wherein the request is received at the edge device, and wherein the edge device communicates with an origin server, which stores data items. If the request includes a token identifier, the system uses the token identifier to look up a token payload in a token cache at the edge device. The system then decorates the request with fields from the token payload, and analyzes the decorated request to determine whether the user is authorized to access the data item. If the user is authorized to access the data item, the system looks up the data item in a content cache at the edge device, and returns the data item to the user to complete the request.

25 Claims, 7 Drawing Sheets

(51) Int. Cl.
G06F 21/62 (2013.01)
H04L 29/08 (2006.01)

(52) U.S. Cl.
CPC .......... *H04L 63/102* (2013.01); *H04L 63/108* (2013.01); *H04L 67/24* (2013.01); *H04L 67/2814* (2013.01); *H04L 67/2842* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 9,210,177 | B1* | 12/2015 | Hughes | H04L 63/205 |
| 10,708,380 | B2* | 7/2020 | Busayarat | H04L 67/32 |
| 2003/0196118 | A1* | 10/2003 | Ushiki | H04L 67/306 |
| | | | | 713/152 |
| 2007/0136603 | A1* | 6/2007 | Kuecuekyan | H04L 63/102 |
| | | | | 713/185 |
| 2008/0288648 | A1* | 11/2008 | Schneider | H04L 67/28 |
| | | | | 709/229 |
| 2010/0008290 | A1* | 1/2010 | Fischer | H04L 65/103 |
| | | | | 370/328 |
| 2011/0231443 | A1* | 9/2011 | Hannel | H04L 63/20 |
| | | | | 707/776 |
| 2012/0005738 | A1* | 1/2012 | Manini | H04L 63/0209 |
| | | | | 726/7 |
| 2012/0173541 | A1* | 7/2012 | Venkataramani | G06F 16/248 |
| | | | | 707/747 |
| 2012/0311038 | A1* | 12/2012 | Trinh | H04L 65/1083 |
| | | | | 709/204 |
| 2013/0166634 | A1* | 6/2013 | Holland | G06F 11/3419 |
| | | | | 709/203 |
| 2013/0167211 | A1* | 6/2013 | Kamat | H04L 63/20 |
| | | | | 726/7 |
| 2013/0188598 | A1* | 7/2013 | Zakrzewski | H04L 67/2842 |
| | | | | 370/331 |
| 2014/0230044 | A1* | 8/2014 | Liu | H04L 12/4633 |
| | | | | 726/15 |
| 2015/0095642 | A1* | 4/2015 | Spalka | G06F 21/6227 |
| | | | | 713/161 |
| 2016/0330172 | A1* | 11/2016 | Muttik | H04L 63/101 |
| 2017/0085667 | A1* | 3/2017 | Flack | H04L 67/2842 |
| 2017/0171125 | A1* | 6/2017 | Chow | G06F 16/957 |
| 2018/0332016 | A1* | 11/2018 | Pandey | H04L 63/108 |

OTHER PUBLICATIONS

A Taxonomy of Cyber Attacks on SCADA Systems Bonnie Zhu, Anthony Joseph, Shankar Sastry IEEE International Conferences on Internet of Things, and Cyber, Physical and Social Computing, pp. 380-388, doi: 10.1109/iThings/CPSCom.2011.34. (Year: 2011).*

* cited by examiner

FACILITATING REQUEST AUTHENTICATION AT A NETWORK EDGE DEVICE

BACKGROUND

Field

The disclosed embodiments generally relate to the design of edge networks, which enable data to be processed and stored on edge devices that are located remotely from an associated central data center. More specifically, the disclosed embodiments relate to a system that facilitates rapidly authenticating and processing user requests at network edge devices.

Related Art

Recent advances in cloud computing presently make it possible for organizations to offload computing tasks to remotely located "cloud data centers," which are operated by third-party cloud service providers, such as Amazon Web Services™ (AWS). This frees the organizations from the considerable expense involved in provisioning and maintaining their own in-house data centers. It also makes it easier for an organization to dynamically adapt the size of their computing infrastructure to match the evolving computational requirements of the organization.

A major challenge in using a cloud-based computing infrastructure is that performance problems can arise as requests are communicated across the internet to be processed at the remotely located cloud data centers. To alleviate these performance problems, organizations often use "edge devices," which are located throughout the internet in close proximity to users, to store data and process associated requests. These edge devices typically provide a cache to store copies of data items that are retrieved from cloud data centers. This makes it possible to process requests from users without having to access remote data centers.

However, enabling a user to access a data item in an edge cache gives rise to the problem of authenticating the user and also determining whether the user is authorized to access the data item. This problem is typically solved by asking an arbiter located at a central data center to perform these authentication and authorization operations. However, this causes performance problems because performing authentication and authorization operations through communications with a central data center can involve significant communication-related delays.

Hence, what is needed is a technique for authenticating a user and determining whether the user is authorized to access a data item at an edge device without having to send a request to a remotely located cloud data center.

SUMMARY

The disclosed embodiments relate to a system that processes requests to access data item at an edge device in a network. During operation, the system receives the request to access the data item from a user, wherein the request is received at the edge device, and wherein the edge device communicates with an origin server, which stores data items. If the request includes a token identifier, the system uses the token identifier to look up a token payload in a token cache at the edge device. The system then decorates the request with fields from the token payload, and analyzes the decorated request to determine whether the user is authorized to access the data item. If the user is authorized to access the data item, the system looks up the data item in a content cache at the edge device, and returns the data item to the user to complete the request.

In some embodiments, if the request does not include a token identifier, the system forwards the request to the origin server. The origin server then redirects the request to a login service, which commences a login sequence with the user. If the login sequence completes successfully, a token service creates a token for the user and embeds an associated token identifier in the request.

In some embodiments, embedding the associated token identifier in the request involves embedding the token identifier in a browser cookie, which is part of the request.

In some embodiments, while looking up the token payload in the token cache, the system determines whether the token payload is present in the token cache. If the token payload is present in the token cache, the system returns the token payload to complete the token payload lookup. On the other hand, if the token payload is not present in the token cache, the system: retrieves the token payload from the origin server; stores the token payload in the token cache; and returns the token payload to complete the token payload lookup.

In some embodiments, while looking up the data item in the content cache, the system determines whether the data item is present in the content cache. If the data item is present in the content cache, the system returns the data item to complete the data item lookup. On the other hand, if the data item is not present in the content cache, the system: retrieves the data item from the origin server; stores the data item in the content cache; and returns the data item to complete the data item lookup.

In some embodiments, the request comprises an HTTP request.

In some embodiments, when the user is terminated, the system deletes an account associated with the user, and also invalidates all tokens associated with the user at the origin server. The system additionally performs a push operation to send a purge command to one or more edge devices in the network to invalidate all cached copies of tokens associated with the user.

In some embodiments, upon receiving a request to extend a lifetime of a token, the system increases an expiry time for the token.

In some embodiments, the token payload includes one or more of the following: a valid field; a revoked field; a token expiry time; a list of headers to be added to the request; one or more restrictions to be applied while processing the token; and one or more origin server locations for the user.

In some embodiments, the list of headers includes headers that contain one or more of the following: a user identifier; an account identifier; a billing level; a rate limit; an AB testing group identifier; and an admin identifier.

In some embodiments, the one or more restrictions specify a limited range of IP addresses that the token can be accessed from.

In some embodiments, tokens are created using an opaque hierarchy, which is based on users and/or accounts. This opaque hierarchy is used to facilitate token invalidation operations and extending sessions associated with tokens.

In some embodiments, the edge device comprises a point-of-presence (POP).

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Cloud Computing Infrastructure

Figure 1:
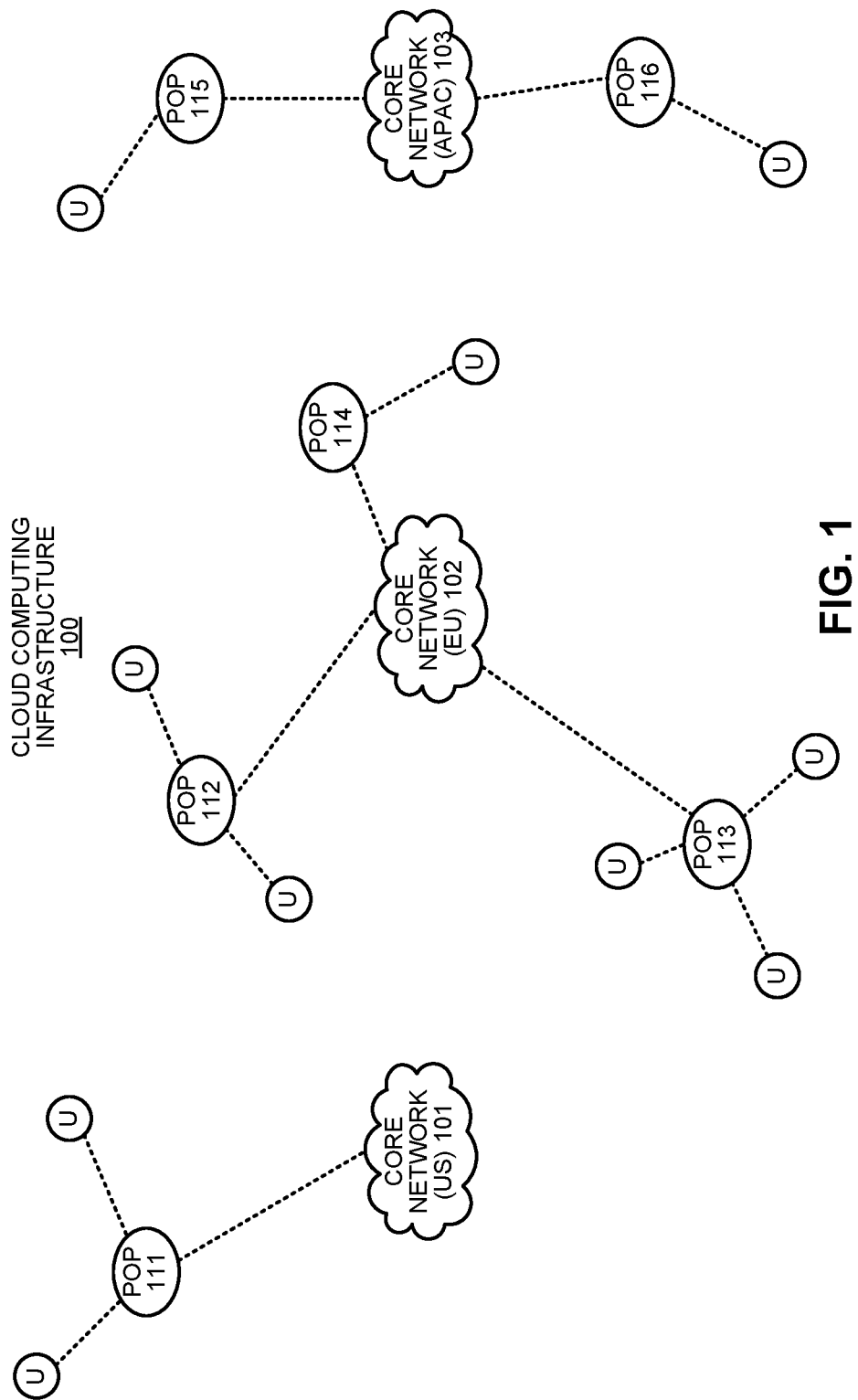
FIG. 1 illustrates a cloud computing infrastructure distributed across the internet in accordance with the disclosed embodiments.

FIG. 1 illustrates a cloud computing infrastructure 100 that is distributed across the internet in accordance with the disclosed embodiments. Cloud computing infrastructure 100 includes a number of core networks 101-103, which contain computing resources, including databases that store user data and associated computing power. Core networks 101-103 can be located in different geographic regions to service users who are located in those different regions. For example, in the embodiment of the system illustrated in FIG. 1, core network 101 is located in the United States (US), core network 102 is located in the European Union (EU), and core network 103 is located in the Asia-Pacific (APAC) region.

Cloud computing infrastructure 100 also includes a number of points-of-presence (POPs), which are implemented on "edge devices" that are distributed throughout the internet. These POPs 111-116 include caches, which can be used to cache copies of data items that are stored on core networks 101-103. This enables POPs 111-116 to service requests from nearby users, which are represented by the nodes labeled "U" in FIG. 1, without having to communicate with distant core networks 101-103. Hence, during operation of cloud computing infrastructure 100, core networks 101-103 can function as "origin servers" for data items cached in POPs 111-116.

Communications between the users and POPs 111-116, and between POPs 111-116 and core networks 101-103 are illustrated as dashed lines in FIG. 1. These communications can take place across secure communication links that use a secure communication protocol, such as HyperText Transfer Protocol Secure (HTTPS), to prevent malicious users from gaining access to the communications.

Figure 2:
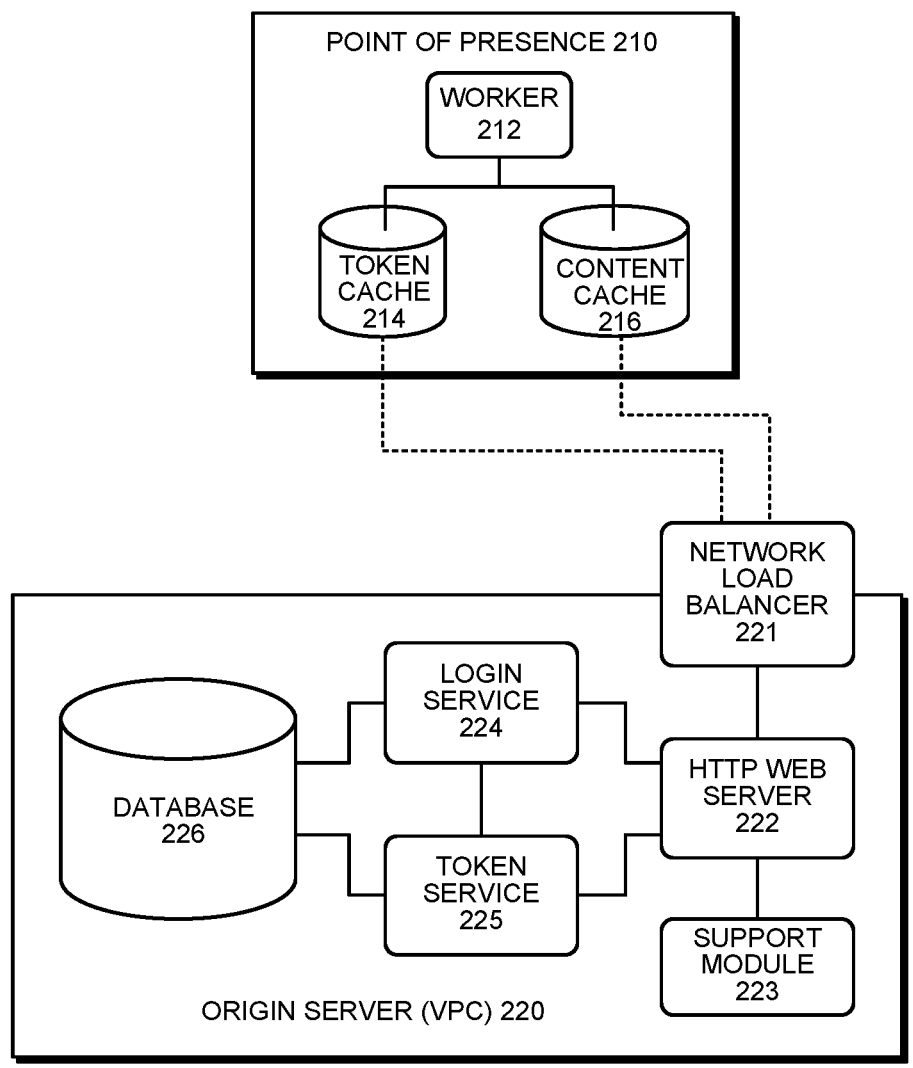
FIG. 2 illustrates an exemplary POP, which interacts with an origin server, in accordance with the disclosed embodiments.

FIG. 2 illustrates an exemplary POP 210, which interacts with an origin server 220, in accordance with the disclosed embodiments. In some embodiments, origin server 220 is located within a virtual private cloud (VPC).

As illustrated in FIG. 2, POP 210 includes a worker 212, which can be implemented as a process executing on POP 210. Worker 212 performs various operations to service user requests as described in more detail below. While processing these user requests, worker 212 can access a token cache 214, which contains copies of token payloads, and a content cache, which contains copies of data items.

Cache misses in both token cache 214 and content cache 216 are serviced by retrieving token payloads or data items from database 226, which is located in origin server 220. During this process, communications from POP 210 to origin server 220 first feed into a network load balancer (NLB) 221, and then into an HTTP web server 222. (In some embodiments, HTTP web server 222 is implemented using open-source code, such as NGINX™.) HTTP web server 222 forwards requests to support module 223, which controls various operations associated with user authentication and accessing data items. In doing so, support module 223 can make requests to a login service 224 and a token service 225, and can also directly access database 226.

Example

We now describe an exemplary interaction between a user and the system in accordance with the described embodiments. At the start of this interaction, the user sends a request to obtain an agent interface to the worker 212 in POP 210. In response to the request, worker 212 performs a lookup in content cache 216. This lookup causes a cache miss, which is forwarded to support module 223 in origin server 220. Support module 223 sees that the user is not actually logged in and causes the request be redirected to login service 224, which provides a login page to the user. The user then types in a username and password, which are returned to login service 224. After the username and password are properly verified by login service 224, login service 224 causes token service 225 to create a new token for the user. Login service 224 then embeds the token in a browser cookie, which is associated with the request, and the user is redirected back to support module 223.

The user's browser now initiates a new request, which includes the token identifier. While processing this new request, worker 212 uses this token identifier to look up the corresponding token payload in token cache 214. This causes a cache miss, which propagates back to token service 225. Token service 225 responds to worker 212 with an associated token payload, which is stored in token cache 214. Worker 212 then decorates the request with headers from the token payload and forwards the decorated request to support module 223.

Support module 223 then responds with an agent interface. The user receives the agent interface and then proceeds to reload the agent interface, which causes a request for a data item, which includes the token identifier, to be sent to worker 212. In response to this request, worker 212 performs a lookup in token cache 214 based on the token identifier. This lookup causes a cache hit, which returns the associated token payload. Worker 212 then checks the restrictions specified in the token payload and decorates the request with headers from the token payload. Worker 212 then forwards the request to support module 223 in origin server 220. Support module 223 responds with the user's data item, which is stored in content cache 216.

When a subsequent request for the data item is received by worker 212, the request can be authenticated by performing a lookup in token cache 214. The associated data item can then be retrieved from content cache 216. Note that these operations can take place without having to access origin server 220.

Next, suppose the user gets fired and a system administrator deletes the user's account. This deletion also causes the copy of the token in login service 224 to be deleted. The system additionally performs a "push operation," which sends a purge command to one or more edge devices in the network to invalidate all cached copies of tokens associated with the user.

The next time the user submits a request with the token identifier, worker 212 performs a lookup in token cache 214, and the associated token payload is no longer there. In this case, the token identifier is forwarded to token service 225 and token service 225 responds that the token is invalid. At this point, the request can be rejected outright, or alternatively the request can be resubmitted without decoration. In this case, when the request arrives at support module 223, support module 223 sees that there are no decorations, which indicates the user is not authenticated, and redirects the request back to login service 224.

Note that the token identifier functions as a key that is used to look up a much larger token payload, which includes decorations for the request. The relatively small size of the token identifier enables it to fit in a browser cookie. Also note that it is not possible to fit a large number of decorations in a cookie.

The token identifier described above does not have to be cryptographic. This means the system does not have to perform time-consuming cryptographic operations to sign and hash payload values, and to verify signatures while performing authentication and authorization operations. The authentication and authorizations operations can instead involve simple cache lookups.

Processing a Request

Figure 3:
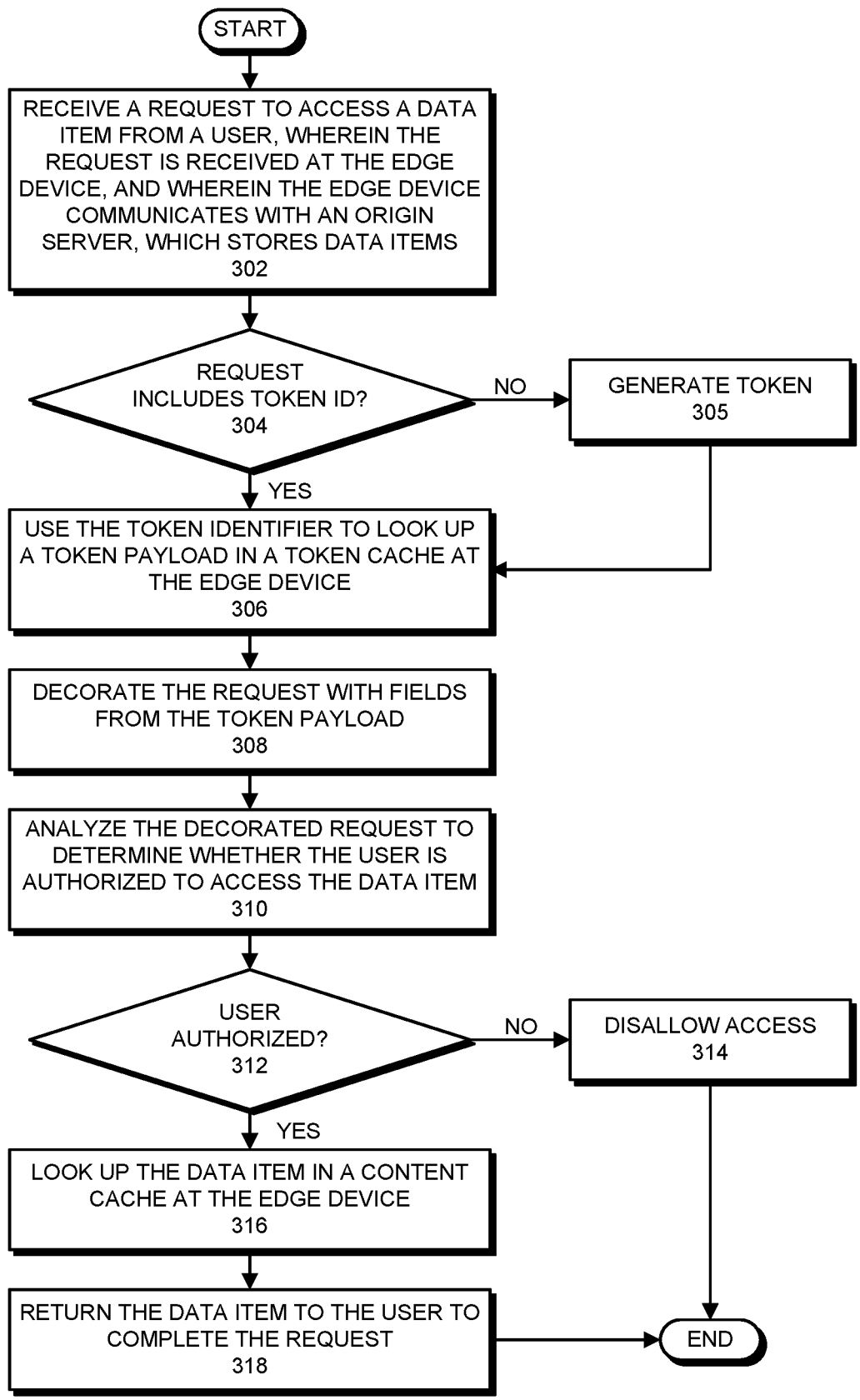
FIG. 3 presents a flow chart illustrating operations involved in processing a request to access a data item at an edge device in accordance with the disclosed embodiments.

FIG. 3 presents a flow chart illustrating operations involved in processing a request to access a data item at an edge device in accordance with the disclosed embodiments.

During operation, the system receives the request to access the data item from a user, wherein the request is received at the edge device, and wherein the edge device communicates with an origin server, which stores data items (step 302). Next, the system determines if the request includes a token identifier (step 304). If so (YES at step 304), the system uses the token identifier to look up a token payload in a token cache at the edge device (step 306). The system then decorates the request with fields from the token payload (step 308), and analyzes the decorated request to determine whether the user is authorized to access the data item (310). On the other hand, if the request does not include a token identifier (NO at step 304), the system generates a token (step 305) and proceeds to step 306. (The process of generating a token is described in more detail below with reference to the flow chart in FIG. 4.) Next, if the user is authorized to access the data item (YES at step 312), the system looks up the data item in a content cache at the edge device (step 316), and returns the data item to the user to complete the request (step 318). On the other hand, if the user is not authorized to access the data item (NO at step 312), the system disallows the access (step 314).

Figure 4:
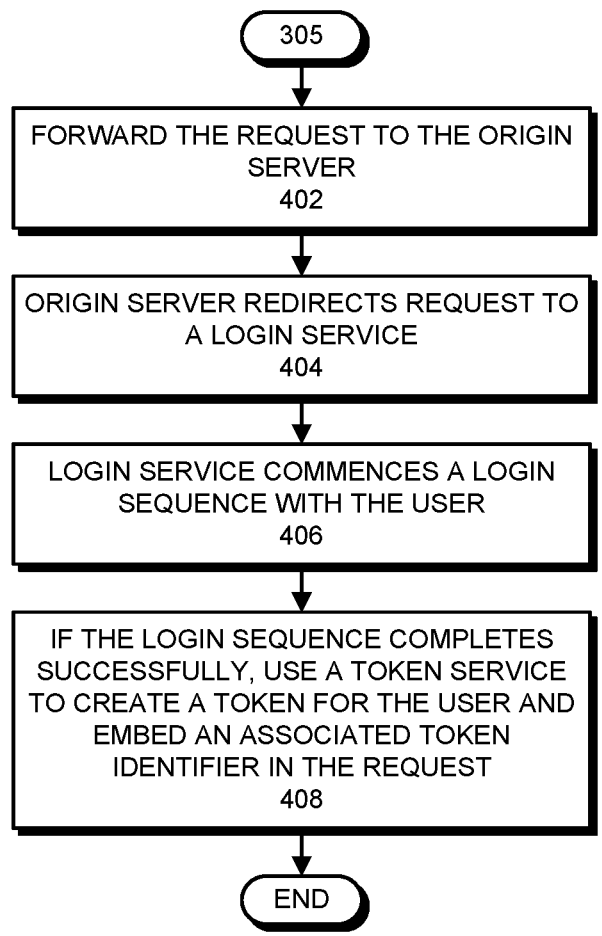
FIG. 4 presents a flow chart illustrating operations involved in generating a token in accordance with the disclosed embodiments.

FIG. 4 presents a flow chart illustrating the process of generating a token in accordance with the disclosed embodiments. (This flow chart illustrates in more detail the operations involved in performing step 305 in the flow chart in FIG. 3.) The system first forwards the request to the origin server (step 402). The origin server then redirects the request to a login service (step 404). Next, the login service commences a login sequence with the user (step 406). If the login sequence completes successfully, the system uses a token service to create a token for the user and embed an associated token identifier in the request (step 408).

Figure 5:
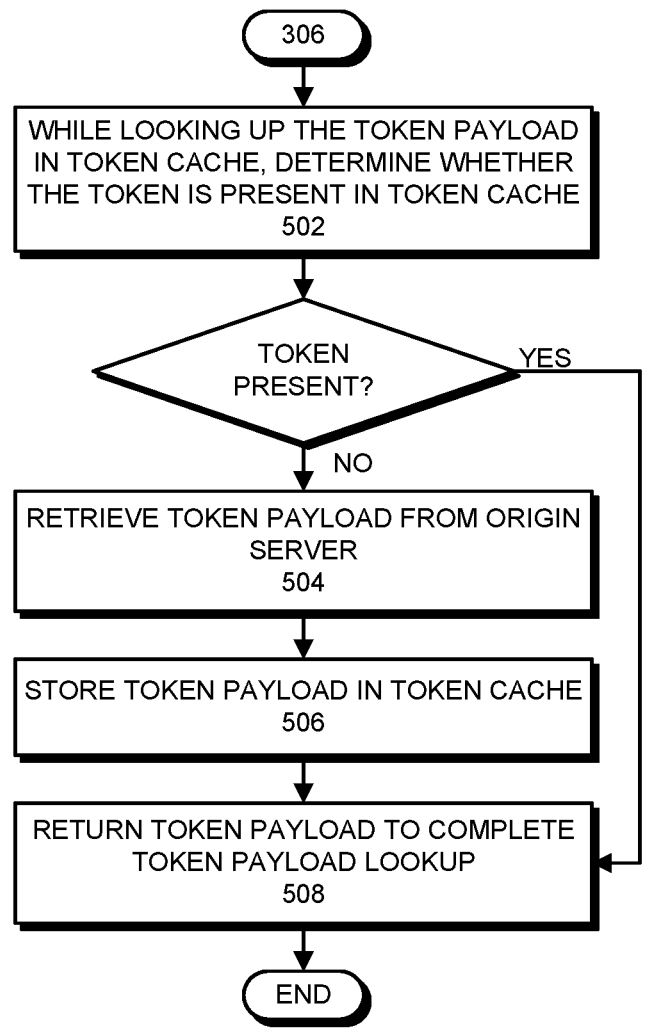
FIG. 5 presents a flow chart illustrating operations involved in looking up a token in a token cache in accordance with the disclosed embodiments.

FIG. 5 presents a flow chart illustrating operations involved in looking up a token in a token cache in accordance with the disclosed embodiments. (This flow chart illustrates in more detail the operations involved in performing step 306 in the flow chart in FIG. 3.) First, while looking up the token payload in the token cache, the system determines whether the token payload is present in the token cache (step 502). If so, the system returns the token payload to complete the token payload lookup (step 508). On the other hand, if the token payload is not present in the token cache, the system retrieves the token payload from the origin server (step 504), and stores the token payload in the token cache (step 506). Finally, the system returns the token payload to complete the token payload lookup (step 508).

Figure 6:
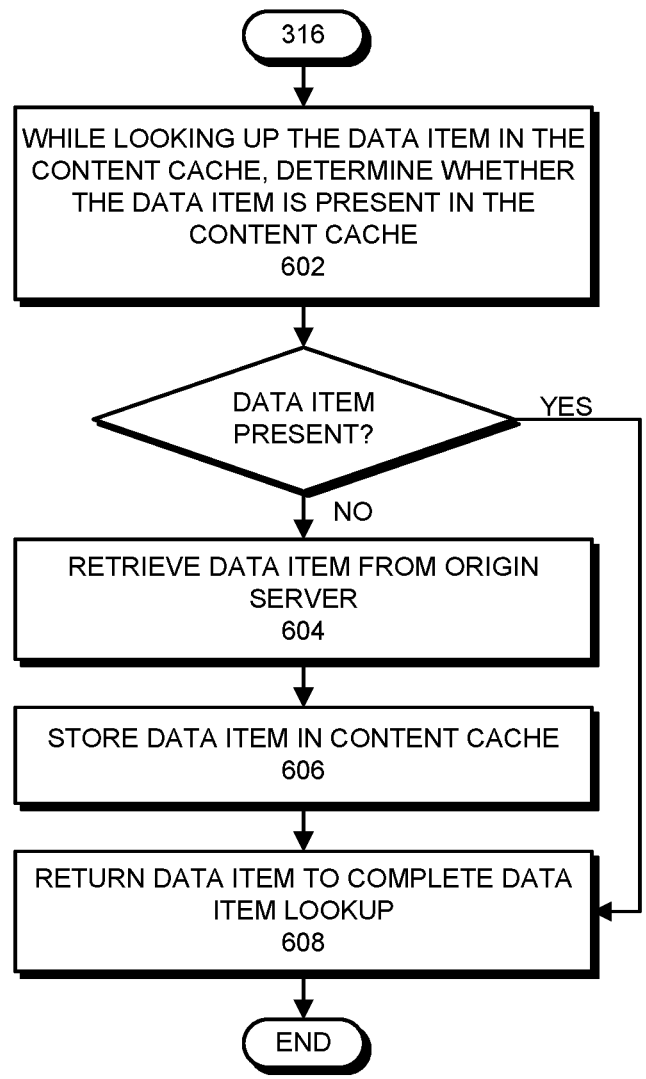
FIG. 6 presents a flow chart illustrating operations involved in looking up a data item in a content cache in accordance with the disclosed embodiments.

FIG. 6 presents a flow chart illustrating operations involved in looking up a data item in a content cache in accordance with the disclosed embodiments. (This flow chart illustrates in more detail the operations involved in performing step 316 in the flow chart in FIG. 3.) First, while looking up the data item in the content cache, the system determines whether the data item is present in the content cache (step 602). If the data item is present in the content cache, the system returns the data item to complete the data item lookup (step 608). On the other hand, if the data item is not present in the content cache, the system retrieves the data item from the origin server (step 604), and stores the data item in the content cache (step 606). Finally, the system returns the data item to complete the data item lookup (step 608).

Figure 7:
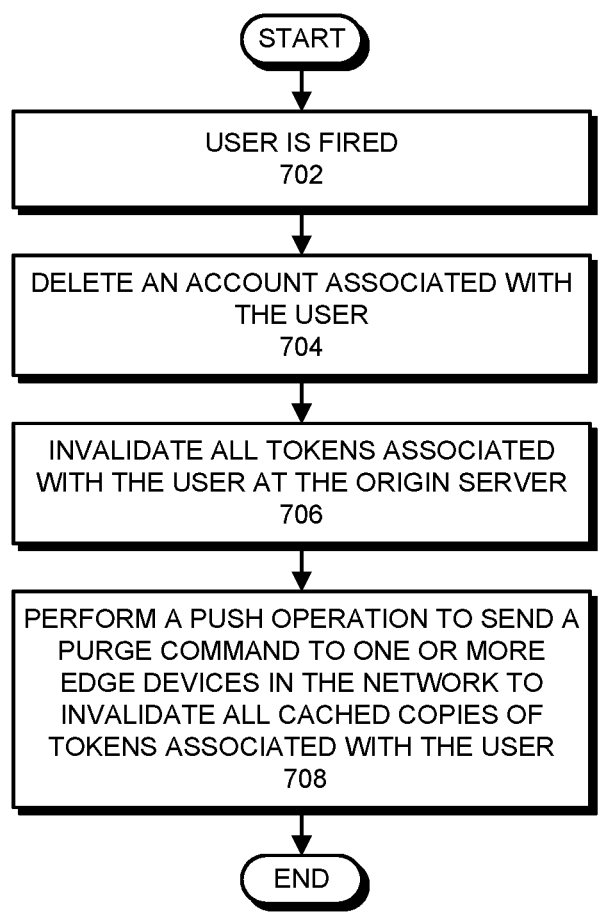
FIG. 7 presents a flow chart illustrating operations involved in invalidating tokens associated with a user in accordance with the disclosed embodiments.

FIG. 7 presents a flow chart illustrating operations involved in invalidating tokens associated with a user in accordance with the disclosed embodiments. At the start of this process, the user is fired (step 702). Next, the system deletes an account associated with the user (step 704), and also invalidates all tokens associated with the user at the origin server (step 706). Finally, the system performs a push operation to send a purge command to one or more edge devices in the network to invalidate all cached copies of tokens associated with the user (step 708).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for processing a request to access a data item at an edge device in a network, comprising:
   receiving from a user the request to access the data item, wherein the request is received at the edge device, and wherein the edge device communicates with an origin server that stores data items;
   if the request includes a token identifier:
     using the token identifier to look up a token payload in a token cache at the edge device;
     decorating the request with fields from the token payload; and
     analyzing the decorated request to determine whether the user is authorized to access the data item;
   if the user is authorized to access the data item:
     looking up the data item in a content cache at the edge device; and
     returning the data item to the user to complete the request; and
   if the request does not include a token identifier:
     forwarding the request to the origin server, wherein the origin server redirects the request to a login service, which commences a login sequence with the user; and
     if the login sequence completes successfully, using a token service to create a token for the user and to embed an associated token identifier in the request.

2. The method of claim 1, wherein embedding the associated token identifier in the request involves embedding the token identifier in a browser cookie, which is part of the request.

3. The method of claim 1, wherein looking up the token payload in the token cache comprises:
   determining whether the token payload is present in the token cache;
   if the token payload is present in the token cache:
     returning the token payload to complete the token payload lookup;
   and
   if the token payload is not present in the token cache:
     retrieving the token payload from the origin server;
     storing the token payload in the token cache; and
     returning the token payload to complete the token payload lookup.

4. The method of claim 1, wherein looking up the data item in the content cache comprises:
   determining whether the data item is present in the content cache;
   if the data item is present in the content cache:
     returning the data item to complete the data item lookup; and
   if the data item is not present in the content cache:
     retrieving the data item from the origin server;
     storing the data item in the content cache; and
     returning the data item to complete the data item lookup.

5. The method of claim 1, wherein the request comprises an HTTP request.

6. The method of claim 1, wherein when the user is terminated, the method further comprises:
   deleting an account associated with the user;
   invalidating all tokens associated with the user at the origin server; and
   performing a push operation to send a purge command to one or more edge devices in the network to invalidate all cached copies of tokens associated with the user.

7. The method of claim 1, wherein upon receiving a request to extend a lifetime of a token, the method further comprises increasing an expiry time for the token.

8. The method of claim 1, wherein the token payload includes one or more of the following:
   a valid field;
   a revoked field;
   a token expiry time;
   a list of headers to be added to the request;
   one or more restrictions to be applied while processing the token; and
   one or more origin server locations for the user.

9. The method of claim 8, wherein the list of headers includes at least one header that contains one or more of the following:
   a user identifier;
   an account identifier;
   a billing level;
   a rate limit;
   an AB testing group identifier; and
   an admin identifier.

10. The method of claim 8, wherein the one or more restrictions specify a limited range of IP addresses that the token can be accessed from.

11. The method of claim 1, wherein:
    tokens are created using an opaque hierarchy, which is based on users and/or accounts; and
    the opaque hierarchy is used to facilitate token invalidation operations and extending sessions associated with tokens.

12. The method of claim 1, wherein the edge device comprises a point-of-presence (POP).

13. A non-transitory computer-readable storage medium storing instructions that when executed by a computer cause the computer to perform a method for processing a request to access a data item at an edge device in a network, the method comprising:
    receiving from a user the request to access the data item, wherein the request is received at the edge device, and wherein the edge device communicates with an origin server that stores data items;
    if the request includes a token identifier,
      using the token identifier to look up a token payload in a token cache at the edge device;
      decorating the request with fields from the token payload; and analyzing the decorated request to determine whether the user is authorized to access the data item;
if the user is authorized to access the data item:
looking up the data item in a content cache at the edge device; and
returning the data item to the user to complete the request; and
if the request does not include a token identifier:
forwarding the request to the origin server, wherein the origin server redirects the request to a login service, which commences a login sequence with the user; and
if the login sequence completes successfully, using a token service to create a token for the user and to embed an associated token identifier in the request.

14. The non-transitory computer-readable storage medium of claim 13, wherein embedding the associated token identifier in the request involves embedding the token identifier in a browser cookie, which is part of the request.

15. The non-transitory computer-readable storage medium of claim 13, wherein looking up the token payload in the token cache comprises:
determining whether the token payload is present in the token cache;
if the token payload is present in the token cache:
returning the token payload to complete the token payload lookup; and
if the token payload is not present in the token cache:
retrieving the token payload from the origin server;
storing the token payload in the token cache; and
returning the token payload to complete the token payload lookup.

16. The non-transitory computer-readable storage medium of claim 13, wherein looking up the data item in the content cache comprises:
determining whether the data item is present in the content cache;
if the data item is present in the content cache:
returning the data item to complete the data item lookup; and
if the data item is not present in the content cache:
retrieving the data item from the origin server;
storing the data item in the content cache; and
returning the data item to complete the data item lookup.

17. The non-transitory computer-readable storage medium of claim 13, wherein the request comprises an HTTP request.

18. The non-transitory computer-readable storage medium of claim 13, wherein when the user is terminated, the method further comprises:
deleting an account associated with the user;
invalidating all tokens associated with the user at the origin server; and
performing a push operation to send a purge command to one or more edge devices in the network to invalidate all cached copies of tokens associated with the user.

19. The non-transitory computer-readable storage medium of claim 13, wherein upon receiving a request to extend a lifetime of a token, the method further comprises increasing an expiry time for the token.

20. The non-transitory computer-readable storage medium of claim 13, wherein the token payload includes one or more of the following:
a valid field;
a revoked field;
a token expiry time;
a list of headers to be added to the request;
one or more restrictions to be applied while processing the token; and
one or more origin server locations for the user.

21. The non-transitory computer-readable storage medium of claim 20, wherein the list of headers includes at least one header that contains one or more of the following:
a user identifier;
an account identifier;
a billing level;
a rate limit;
an AB testing group identifier; and
an admin identifier.

22. The non-transitory computer-readable storage medium of claim 20, wherein the one or more restrictions specify a limited range of IP addresses that the token can be accessed from.

23. The non-transitory computer-readable storage medium of claim 13,
wherein tokens are created using an opaque hierarchy, which is based on users and/or accounts; and
wherein the opaque hierarchy is used to facilitate token invalidation operations and extending sessions associated with tokens.

24. The non-transitory computer-readable storage medium of claim 14, wherein the edge device comprises a point-of-presence (POP).

25. A system that processes a request to access a data item at an edge device in a network, comprising:
at least one processor and at least one associated memory; and
a request-processing mechanism, which executes on the at least one processor, wherein during operation, the request-processing mechanism:
receives from a user the request to access the data item, wherein the request is received at the edge device, and wherein the edge device communicates with an origin server that stores data items;
if the request includes a token identifier:
uses the token identifier to look up a token payload in a token cache at the edge device;
decorates the request with fields from the token payload; and
analyzes the decorated request to determine whether the user is authorized to access the data item; and
if the user is authorized to access the data item:
looks up the data item in a content cache at the edge device; and returns the data item to the user to complete the request; and if the request does not include a token identifier:
forwards the request to the origin server, wherein the origin server redirects the request to a login service, which commences a login sequence with the user; and
if the login sequence completes successfully, uses a token service to create a token for the user and to embed an associated token identifier in the request.

* * * * *